United States Patent
Björkengren et al.

(10) Patent No.: US 8,166,300 B2
(45) Date of Patent: Apr. 24, 2012

(54) EXTENDING THE DRM REALM TO EXTERNAL DEVICES

(75) Inventors: Ulf Björkengren, Bjärred (SE); Per Ståhl, Klagshamn (SE); Magnus L. Olsson, Ahus (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 594 days.

(21) Appl. No.: 12/300,435

(22) PCT Filed: May 8, 2007

(86) PCT No.: PCT/EP2007/054441
§ 371 (c)(1),
(2), (4) Date: Apr. 17, 2009

(87) PCT Pub. No.: WO2007/131914
PCT Pub. Date: Nov. 22, 2007

(65) Prior Publication Data
US 2009/0313471 A1    Dec. 17, 2009

Related U.S. Application Data

(60) Provisional application No. 60/747,461, filed on May 17, 2006.

(30) Foreign Application Priority Data

May 12, 2006    (EP) .................................... 06113854

(51) Int. Cl.
*H04L 29/06* (2006.01)
*G06F 12/14* (2006.01)
*G06F 7/04* (2006.01)
*G06F 17/30* (2006.01)
*H04N 7/16* (2011.01)

(52) U.S. Cl. ........ 713/170; 713/151; 713/168; 713/193; 726/26

(58) Field of Classification Search ........... 713/150–194
See application file for complete search history.

(56) References Cited

U.S. PATENT DOCUMENTS

| 4,503,287 | A | * | 3/1985 | Morris et al. ................. 380/45 |
| 4,965,825 | A | * | 10/1990 | Harvey et al. ................ 380/233 |
| 6,510,315 | B1 | * | 1/2003 | Arnson ..................... 455/404.1 |
| 2001/0005883 | A1 | * | 6/2001 | Wray et al. .................. 713/151 |
| 2002/0026445 | A1 | * | 2/2002 | Chica et al. .................. 707/100 |
| 2002/0077988 | A1 | * | 6/2002 | Sasaki et al. ................... 705/59 |
| 2002/0099955 | A1 | * | 7/2002 | Peled et al. ................... 713/200 |
| 2003/0009681 | A1 | * | 1/2003 | Harada et al. ................. 713/193 |
| 2003/0072453 | A1 | | 4/2003 | Kelly et al. |

(Continued)

FOREIGN PATENT DOCUMENTS
EP    0 715 246 A    6/1996

*Primary Examiner* — Shin-Hon Chen

(57) ABSTRACT

Disclosed is a method and a system for rendering content on external devices securely. The method comprises setting up a communication channel between a proxy rendering server of a mobile device and an external rendering server of an external device, authenticating at least the external rendering server and upon successful authentication transferring a key from the proxy rendering server to the external rendering server, transferring the content encrypted with the transferred key from the proxy rendering server to the external rendering server for rendering the content, wherein the rendering of the content is performed in one of two modes, either in a preprocessing mode or in a non-preprocessing mode, and wherein a DRM agent is only present in the mobile device.

23 Claims, 8 Drawing Sheets

U.S. PATENT DOCUMENTS

| | | |
|---|---|---|
| 2003/0149886 A1* | 8/2003 | Ito et al. ............... 713/193 |
| 2003/0231765 A1* | 12/2003 | Tardo ............... 380/29 |
| 2004/0158712 A1 | 8/2004 | Lee et al. |
| 2004/0225891 A1* | 11/2004 | Kang et al. ............... 713/193 |
| 2005/0132191 A1* | 6/2005 | Joshi et al. ............... 713/168 |
| 2005/0278787 A1* | 12/2005 | Naslund et al. ............... 726/26 |
| 2006/0010500 A1* | 1/2006 | Elazar et al. ............... 726/27 |
| 2006/0206882 A1* | 9/2006 | Illowsky et al. ............... 717/144 |

* cited by examiner

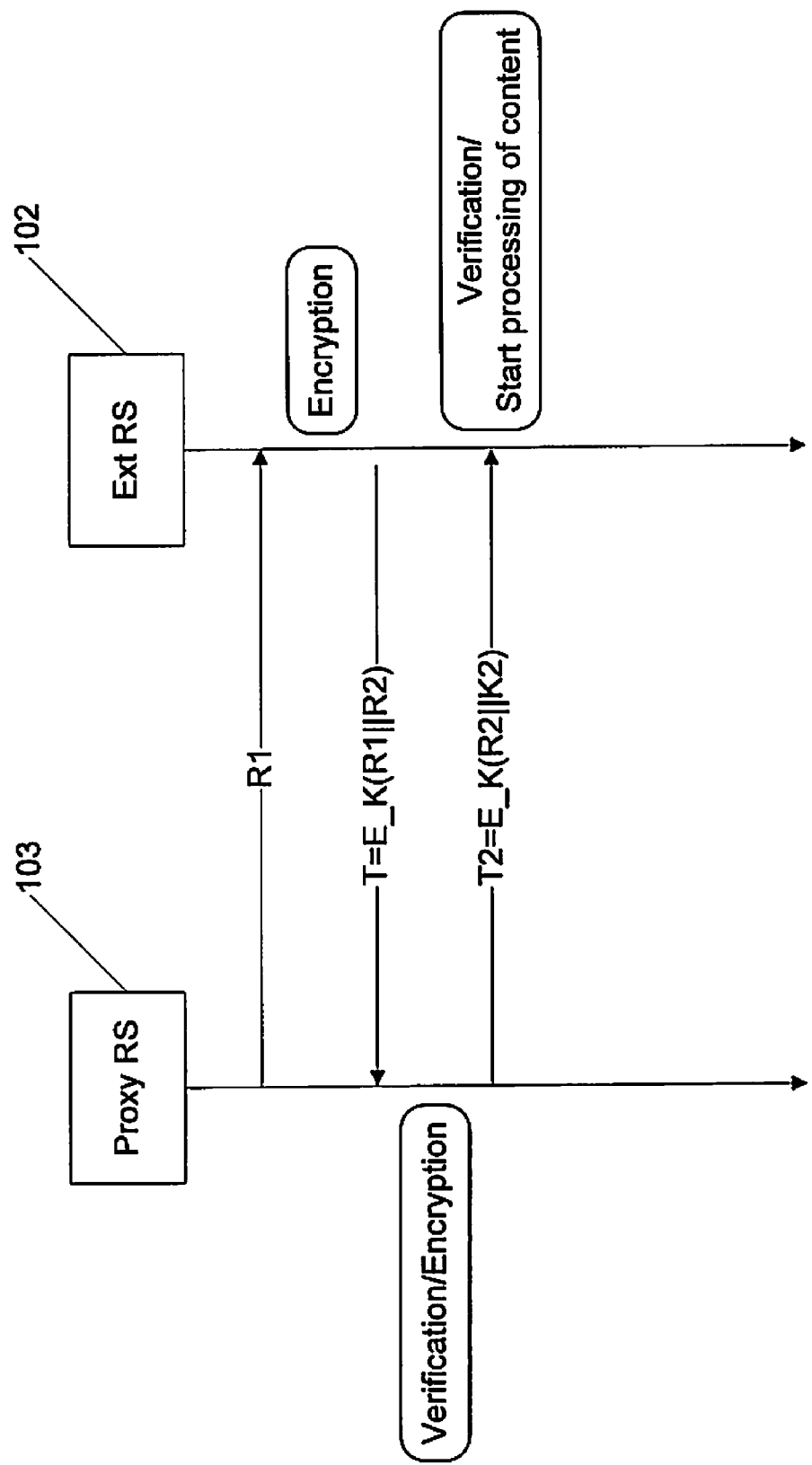

EXTENDING THE DRM REALM TO EXTERNAL DEVICES

This application claims the benefit of U.S. Provisional Application No. 60/747,461, filed May 17, 2006, the disclosure of which is fully incorporated herein by reference.

TECHNICAL FIELD

The present invention relates to an extension of the DRM realm to include external devices. More particularly, the invention relates to a method for rendering content on external devices securely.

BACKGROUND

With increasing functionality and capability of mobile devices, rich media content of high quality and value will also become available. Typically content such as applications or multimedia can be presented, executed or even be used to customize the end-user experience of a device and its applications.

With an expanding set of media formats, content can be combined into a single presentation e.g. using a video projector or be deployed simultaneously over multiple media interfaces such as audio, video and whiteboard in a video conference call.

It is also possible that more complex usage patterns will start to emerge and content be consumed in new ways e.g. using existing content rendering tools but with upgraded user interface (UI) hardware or the entire media stream be directed to an external device to render the content on a large display, projector, printing device, audio device, monitor, computer workstation or any other presentation device.

An external device could be any external device including rendering capabilities with a digital link to a mobile device for receiving content in a digital format and for rendering the content in a non-digital or analogue format, e.g. multimedia such as images, video, audio etc. Content can be defined as any data item in a digital format that can be rendered, i.e. transformed to and/or presented in a non-digital or analogue format.

For content protected with Digital Rights Management (DRM), this requires that the scope for where the content should be protected according to the DRM rules, hereinafter denoted as the DRM realm, need to be extended to devices with rendering capabilities external to a mobile device.

To securely provision and manage the distribution and usage of valuable content it is common to employ a DRM solution e.g. as defined by the OMA DRM standards, see e.g. OMA DRM v2. With DRM, the device implementation handling the presentation needs to be trusted and be certified to comply with a rule set defined by a DRM rights object, i.e. the collection of permissions and other attributes which are linked to protected content. Protected content can be described as digital work that is consumed according to a set of permissions in a rights object and wherein permissions are the actual usage or activity allowed over protected content.

DRM has two main objectives, to prevent unauthorized access to the content, and to control the usage of the content. These objectives are commonly defined to be valid to the point where the content is transformed from its digital representation to a non-digital or analogue representation, e.g. images on a screen, or music from a loud speaker etc.

In current implementations of DRM a DRM agent, the entity in the mobile device that manages permissions for protected content in the mobile device, i.e. the software entity implementing and controlling that the DRM rules are fulfilled, and Rendering Servers, i.e. the software entities transforming the digital representation to a non-digital or analogue format, are implemented as one integral part in view of its physical design, as well as its software control system.

Therefore, the DRM realm needs to be extended to also include external devices comprising rendering servers and thereby rendering capabilities, hereinafter denoted as external rendering servers, which are not part of the same physical device, or software control system, as the entity where the DRM agent resides, e.g. an entity such as a mobile device such as a mobile telephone or communicator i.e. electronic organizer, smart phone, personal digital assistant (PDA), handheld computer etc. The mobile device can be described as an entity, hardware/software or a combination thereof, within a user equipment that implements a DRM agent.

As existing DRM solutions only work end-to-end, assuming a mobile device is the final end point, there is consequently no provisioning for the fact that the mobile device could be upgraded with new hardware (not from the original device manufacturer) or the DRM protected content being exposed in an un-protected manor while being in transit between a mobile device and an external device, such as a presentation device.

There is also nothing that prevents an adversary peripheral device to expose itself as e.g. a harmless printing device while hiding an elaborate solution for reverse engineering content into a content format that could be redistributed strictly against the intention of the DRM protected realm.

US 2004/0158712 discloses a system and method for managing non-free multimedia contents in an intranet. The system includes proxy managers provided in a server of the intranet, for example, a media center or set-top box, and clients, for example, DRM smart clients in wired/wireless digital information appliances, such as Digital TVs or PDAs. Various kinds of encrypted multimedia contents and license information are converted by the proxy managers into multimedia contents and license information having a format executable by the DRM smart clients.

Even though the above prior art method provides a method for managing non-free multimedia content in an intranet, the above method still requires the appliances to include DRM smart clients. Hence, since the above method still requires the appliances to include DRM smart clients, a high DRM complexity is yielded in the appliances. Therefore, it remains a problem to provide a method for rendering content on an external device with limited DRM complexity and capabilities such as a printing device or a video projector that solves the above problems.

In particular, application of the above prior art method would require the proxy manager to receive both protected content and license information from a content provider which it converts and transfers to the client and wherein the client subsequently validates the license information requiring a DRM agent in the client. Furthermore, the above prior art method discloses that no license validation is performed before the content is further converted and transferred to the client.

It is a problem of the above prior art system that the complexity is inevitably increased by the extension of the DRM realm, more specifically the complexity is increased by the need to obtain information regarding e.g. license credentials/information and/or permissions associated to the content and/or which particular DRM scheme that is used in the mobile device, and further the complexity is also increased by the DRM functionality which is required in the external device.

SUMMARY

The method described herein relates to firstly protecting the communication channel, secondly authenticating the rendering servers, and thirdly limiting the complexity in the external devices.

In one embodiment, the above and other problems are solved by a method for rendering content comprising setting up a communication channel between a proxy rendering server of a mobile device and an external rendering server of an external device, authenticating at least the external rendering server and upon successful authentication transferring a key from the proxy rendering server to the external rendering server, transferring the content encrypted with the transferred key from the proxy rendering server to the external rendering server for rendering the content, wherein the rendering of the content is performed in one of two modes, either in a preprocessing mode for performing processing of the content by the mobile device prior to transferring the content to the external rendering server, or in a non-preprocessing mode for performing processing of the content by the external device subsequent to receiving the content, and wherein a DRM agent for digitally managing permissions associated with the content is only present in the mobile device.

In another embodiment, the above and other problems are solved by a system adapted for rendering content, the system comprising a mobile device including application software, a device rendering server, a proxy rendering server, a Digital Rights Management (DRM) Agent, wherein the application software is adapted to direct a request for rendering content to the device rendering server or the proxy rendering server, wherein the DRM agent is adapted to verify license credentials, and an external device including an external rendering server for rendering the content, wherein the system is adapted to perform the rendering of the content in one of two modes, either in a preprocessing mode for performing processing of the content by the mobile device prior to transferring the content to the external rendering server, or in a non-preprocessing mode for performing processing of the content by the external device subsequent to receiving the content, and wherein the DRM agent for digitally managing credentials associated with the content is only present in the mobile device.

In a further embodiment, the above and other problems are solved by an electronic device for facilitating rendering of content in an external device, the electronic device comprising application software for generating a request for rendering content, a rendering server for receiving the request for rendering content, a Digital Rights Management Agent (DRM) Agent for verifying license credentials, a proxy rendering server for setting up a communication channel with the external device and transferring content, wherein the electronic device is adapted to facilitate the content rendering in one of two modes, either in a preprocessing mode for performing processing of content by the electronic device prior to transferring the content to the external rendering server, or in a non-preprocessing mode for performing processing of content by the external device subsequent to receiving the content, and wherein the DRM agent for digitally managing credentials associated with the content is only present in the electronic device.

Two different modes, a preprocessing mode and a non-preprocessing mode, can be distinguished in the rendering operations. An advantage of having a preprocessing mode is that the mobile device then can alleviate the processing requirements on the external rendering server by taking care of possible processing tasks. Further, in the preprocessing mode the proxy rendering server is involved in manipulations of the data, manipulations such as modification of a format or filtering of content or extension of content by adding rendering parameters or synchronisation of content according to a presentation time, followed by re-encryption and transfer to the external rendering server. However, in the non-preprocessing mode the proxy rendering server transfers the data without any other data manipulations. An advantage of manipulating the data in the preprocessing mode is that the external device can remain agnostic of the particular DRM scheme used in the mobile device and thereby reduce the DRM complexity in the external device. Another advantage of manipulating the data in the preprocessing mode is that the mobile device prepares the content for rendering in the external device which decreases the overall complexity and processing requirements in the external device.

Moreover, switching or selection between the two different modes may be performed by means of a capability discovery procedure, e.g. when an external device is connected to a mobile device, wherein the capability discovery procedure indicates which mode to use for the external device, or by means of a policy stored in the mobile device, or by an active decision by an end-user. An advantage of implementing and switching or selecting between these two modes is that the method provides support for most formats and external devices. Further, the combination of the two modes provides flexibility and optimization of processing.

In some embodiments, the preprocessing and the non-preprocessing modes further comprise the steps of authenticating at least the external rendering server via an authentication protocol, and in some embodiments a mutual authentication of the proxy rendering server and the external rendering server is performed, and upon successful authentication, transferring a key from the proxy rendering server to the external rendering server via a key provisioning protocol. It is an advantage of the method described herein that an external device can dispense with a DRM agent whereby the external device instead can benefit from the functions and capabilities of the DRM agent in the mobile device. Another advantage of this method is the enabling of the key exchange via the key provisioning protocol which is a secure exchange that minimizes the risk for intercepting any keys at the exchange.

In some embodiments, the authentication and key provisioning protocols can be preceded by a step of sending rendering parameters or by a cipher suite negotiation protocol. The rendering parameters are chosen from a group comprising encryption cipher, encryption key, initialization vector (IV), padding scheme, offset to byte in content file where decryption should start, and the size of the encrypted content. The cipher suite protocol comprises the steps of the external rendering server sending a cipher suite list to the proxy rendering server, and in response the proxy rendering server responds by sending a random number and the chosen cipher suite to the external rendering server, and wherein the external rendering server verifies the chosen cipher suite, and upon successful verification accepting a commonly negotiated cipher suite. An advantage of sending rendering parameters and running the cipher suite negotiation protocol is the limitation of DRM complexity in the external device and again the external device can remain agnostic of the particular DRM scheme used in the mobile device.

Moreover, according to the method described herein there is no need to forward DRM rights, i.e. license information, to the external device. Hence, an advantage of the method is that the overall complexity, processing power and cost of the external device is reduced due to the limited DRM functionality and DRM complexity which is needed.

The invention will now be described more in detail with the aid of preferred embodiments in connection with the enclosed drawings.

BRIEF DESCRIPTION OF THE DRAWINGS

FIG. 5c illustrates a sequence chart of an embodiment in an authentication and shared secret procedure.

DETAILED DESCRIPTION

To facilitate an understanding of the following embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer readable medium for use by or in connection with an instruction execution system, apparatus, or device, such as a computer based system, processor containing system, or other system that can fetch the instructions from a computer readable medium and execute the instructions.

As used herein, a computer readable medium can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non exhaustive list) of the computer readable medium can include the following: an electrical connection having one or more wires, a random access memory (RAM), a read only memory (ROM), an erasable programmable read only memory (EPROM or Flash memory), and an optical fiber.

Figure 1:
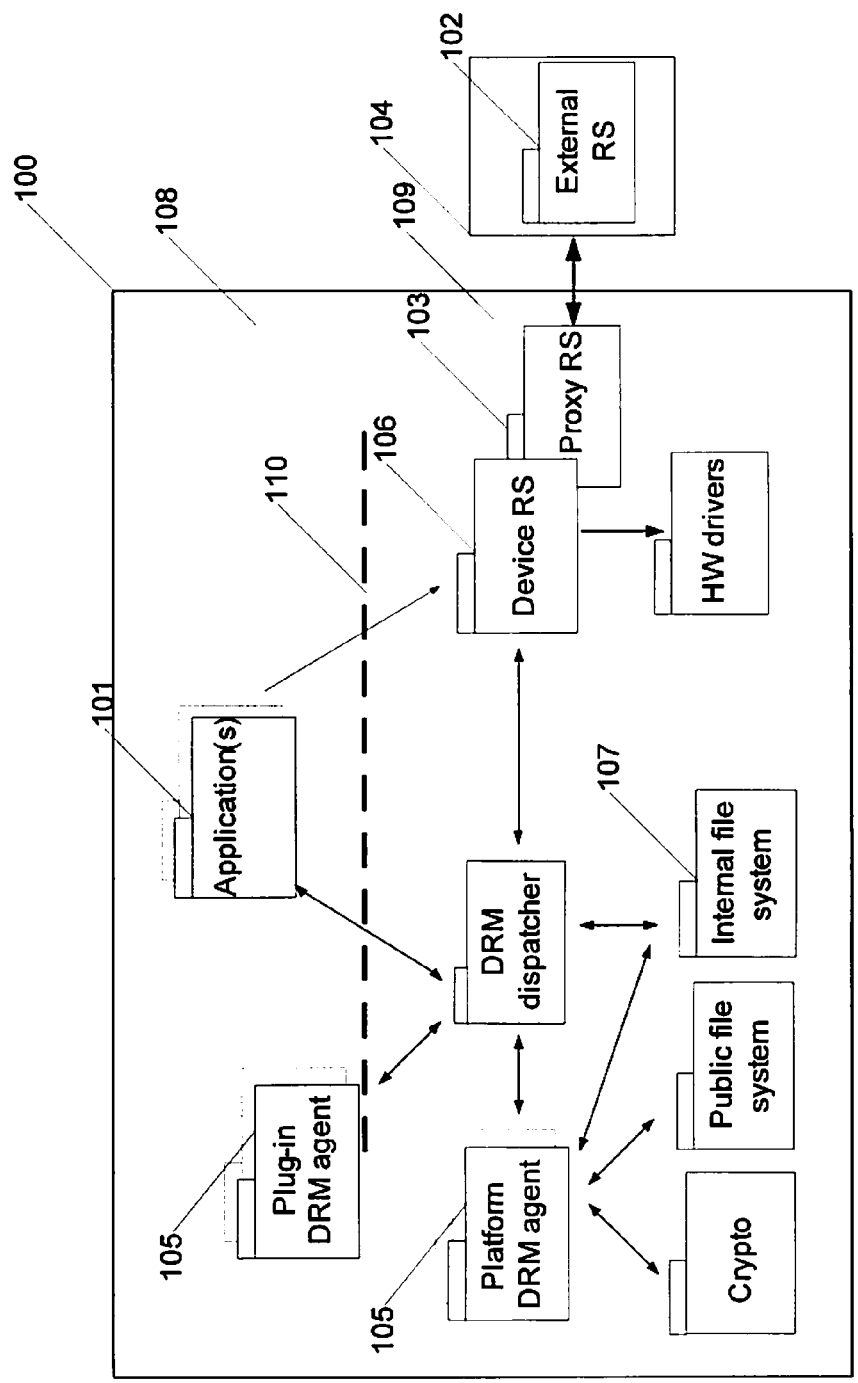
FIG. 1 illustrates a block diagram of a DRM software architecture in a mobile device.

FIG. 1 illustrates a block diagram of a DRM software architecture in a mobile device (100). The architecture comprises software which is divided into a platform part, having a platform software domain (109) that includes fundamental services and software components such as DRM agents (105); and an application part, having an application software domain (108) that includes software components that are more closely related to specific device features and plug-in components which in some embodiments of the invention could be plug-in DRM agents (105). The two domains, platform (109) and application (108), are divided by an Application Programming Interface (API) layer (110) wherein the API layer (110) enables access by e.g. the applications (101) in the application domain (108) to certain services in the platform domain (109). The architecture has proven to be a favorable solution for downloaded content, such as multimedia content or application software (101), due to the design to allow simultaneous support for one or more DRM solutions implemented either in the platform domain (109) (platform DRM agent (105)) or in the application domain (108) (plug-in DRM agent (105)). Each such DRM solution is seen as a separate DRM agent (105). Further, certain DRM tasks may be partly or entirely supported by applications (101), e.g. certain parts of the content/license download, and from a device external view, the DRM agent in the mobile device (100) can be perceived as a platform DRM agent (105), or a plug-in DRM agent (105), plus the DRM related functionality implemented in any applications (101). Therefore, when introducing support for external rendering servers (Ext RS) (102), one or more Proxy rendering servers (Proxy RS) (103) are implemented in the mobile device (100) to provide this support for the external device (104). Thus, the legacy software architecture in mobile devices can be kept with minimum changes or modifications. Also, the license management/validation etc. is kept within the device DRM agent (105), which reduces the DRM-related requirements on the Ext RS (102).

Figure 2:
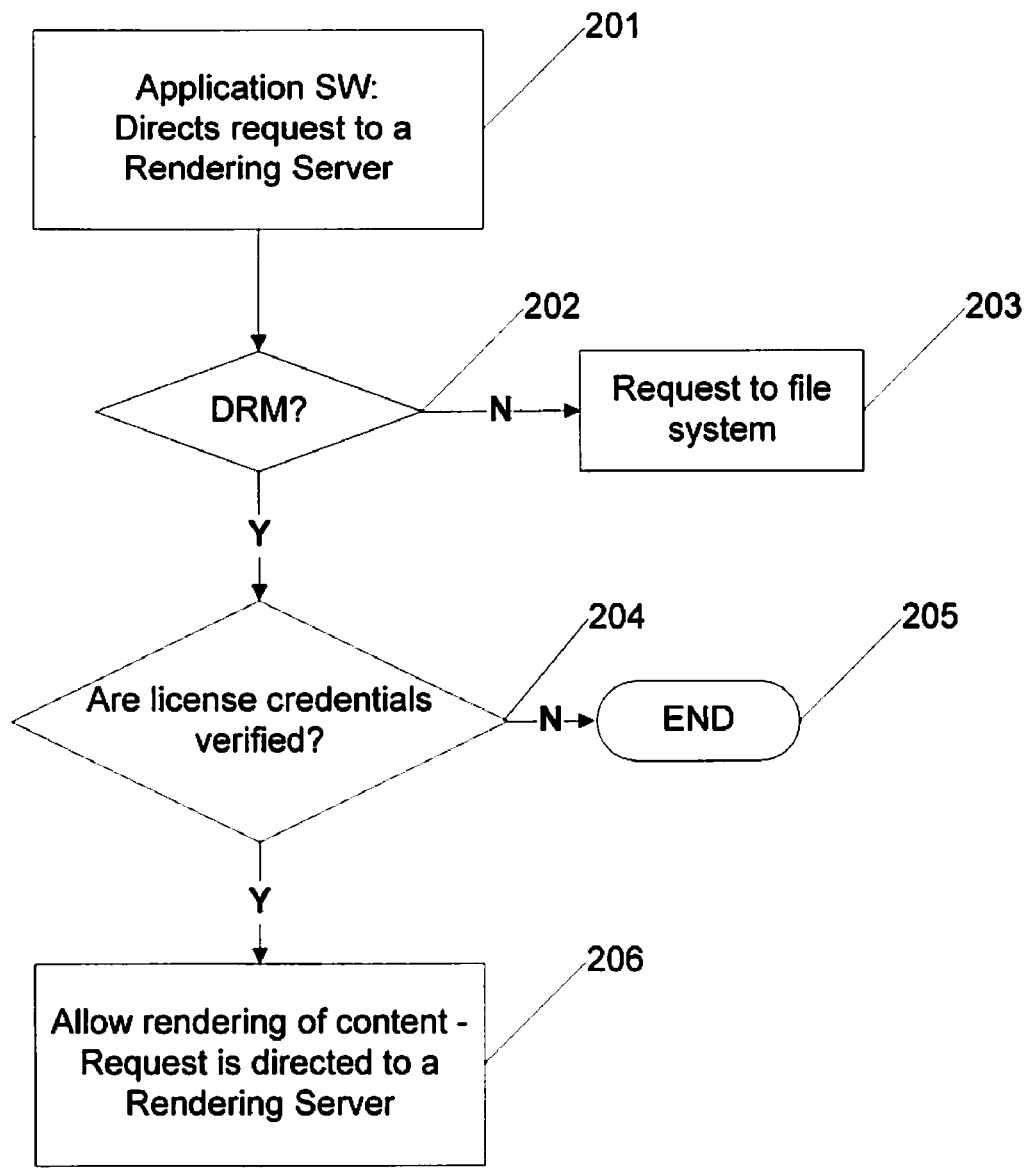
FIG. 2 illustrates a flow chart of an embodiment in a content rendering operation.

FIG. 2 illustrates a flow chart of an embodiment in a content rendering operation. All rendering operations in a mobile device (100), regardless of being DRM, or non-DRM, involving an Ext RS (102) or not, always have an Application (101) as the requestor of the rendering operation. In step 201, the Application (101) directs a content rendering request to a rendering server in the mobile device (100), which in the DRM context then can be either a Device RS (106), or a Proxy RS (103) depending on what domain the rendering server is located in, either in the mobile device realm or the extended DRM realm in case of an external rendering server being used i.e. whether the resources required for the rendering operation, so called rendering resources, are found in the mobile device (100) or in an external device (104). The request from the Application (101) also includes a file reference to the file including the content to be rendered. In step 202, the mobile device (100) determines if the content is protected with DRM or if it is non-protected, in step 203, in the non-protected case (non-DRM) the RS (103 or 106) makes a file open request to the file system (107), and in step 204, in the protected case (DRM) the RS (103 or 106) makes a file open request to the DRM agent (105) wherein the DRM agent (105) evaluates any license(s) associated with the content, and depending on the outcome of the evaluation either ends the process in step 205 or allows the rendering to continue in step 206 wherein the request is directed to the RS (103 or 106). If the rendering is allowed, the rendering is allowed with certain prerequisites such as how many times the content can be rendered or a certain time period in which the content can be rendered. For the embodiments of this invention, a prerequisite could be that the content rendering should only be allowed once since this will yield the least complexity in the external device.

From this stage in the rendering, two different modes can be distinguished in the rendering operations involving a Proxy RS (103) and Ext RS (102)—the preprocessing mode, and the non-preprocessing mode. An advantage of having a preprocessing mode is that the mobile device then can alleviate the processing requirements on the Ext RS (102) by taking care of possible processing tasks. In the preprocessing mode the Proxy RS (103) is involved in manipulations of the decrypted data stream such as modification of a format or filtering of the content or extension of the content by adding rendering parameters or synchronisation of the content according to a presentation time, followed by re-encryption and transfer to the Ext RS (102), while in the non-preprocessing mode the Proxy RS (103) transfers the encrypted data stream without any other data manipulations.

Switching or selection between the two modes, the preprocessing mode and the non-preprocessing mode, can occur at a capability discovery procedure, e.g. when an external device (104) is connecting to a mobile device (100), wherein the capability discovery procedure indicates which mode to use for the external device (104). The mode selection may also be done as a result of a global device setting, set up in advance or defined at the time of connecting or use of the external device (104). Further, what mode to use for an external device (104) may also be selected based on a policy stored in the mobile device (100) or though an active decision by an end-user.

Figure 3:
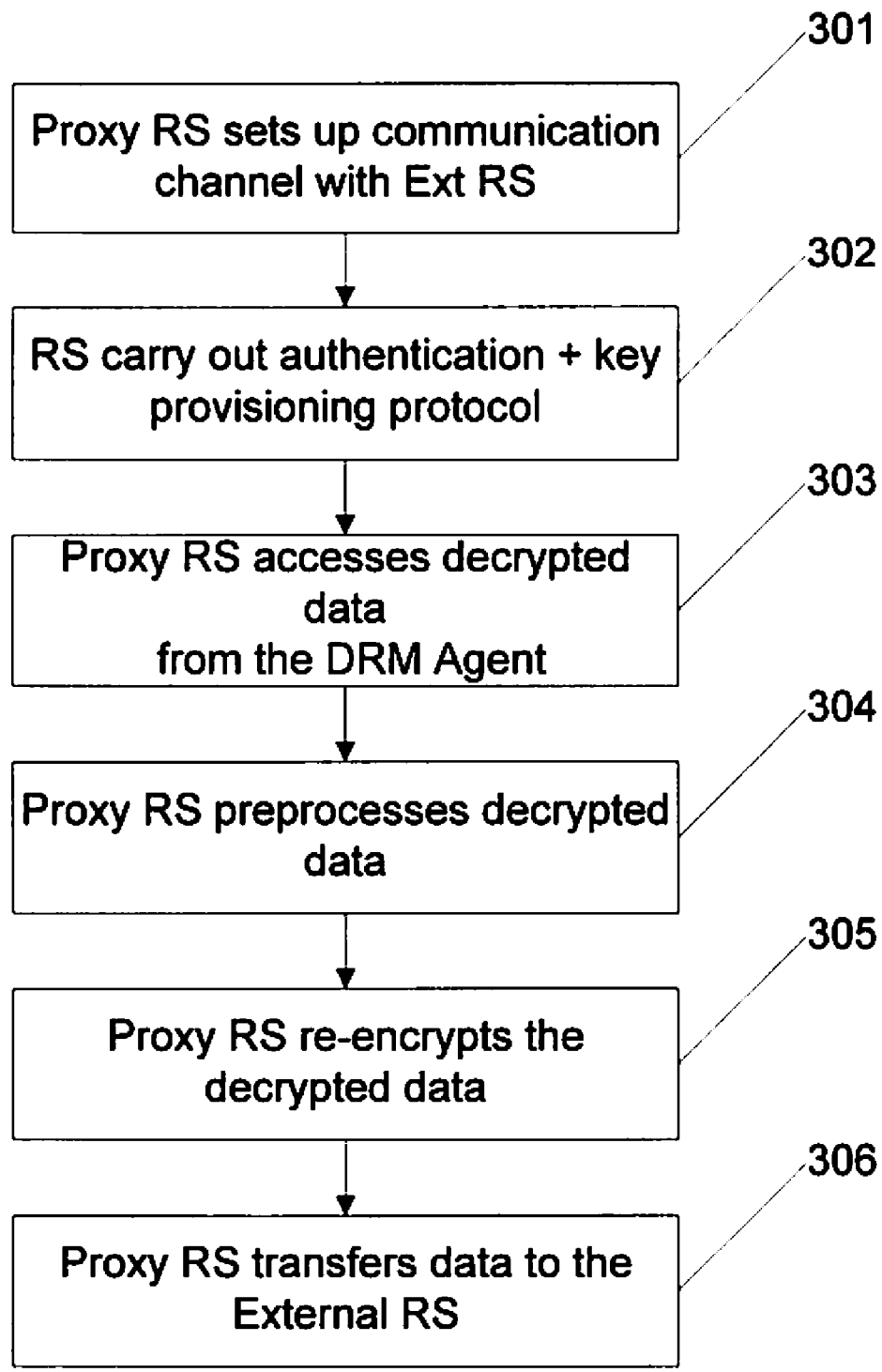
FIG. 3 illustrates a flow chart of an embodiment in a preprocessing mode.

The modes are described in further detail below. FIG. 3 illustrates a flowchart of an embodiment in the preprocessing mode: After completing a successful file open request indicating that a valid license was available for the protected content, the Proxy RS (103) in step 301 then sets up a communication channel with the Ext RS (102), and continues in step 302 with carrying out an authentication protocol, together with a key provisioning protocol to securely transfer a temporary key. The content data transfer from the mobile device (100) to the Ext RS (102) then consists of the following steps; that in step 303 the Proxy RS (103) accesses decrypted data from the DRM agent (105), in step 304 preprocesses the decrypted data, and in step 305 re-encrypts the decrypted data before in step 306 transferring it to the Ext RS (102). The flow control for these operations can have either the Ext RS (102) as responsible via data pull, or the Proxy RS (103) as responsible via data push. Depending on which is the case, the request methods involved in the interface between the Ext RS (102) and the Proxy RS (103) may have different designs, which is well understood by the skilled person in the art.

Figure 4:
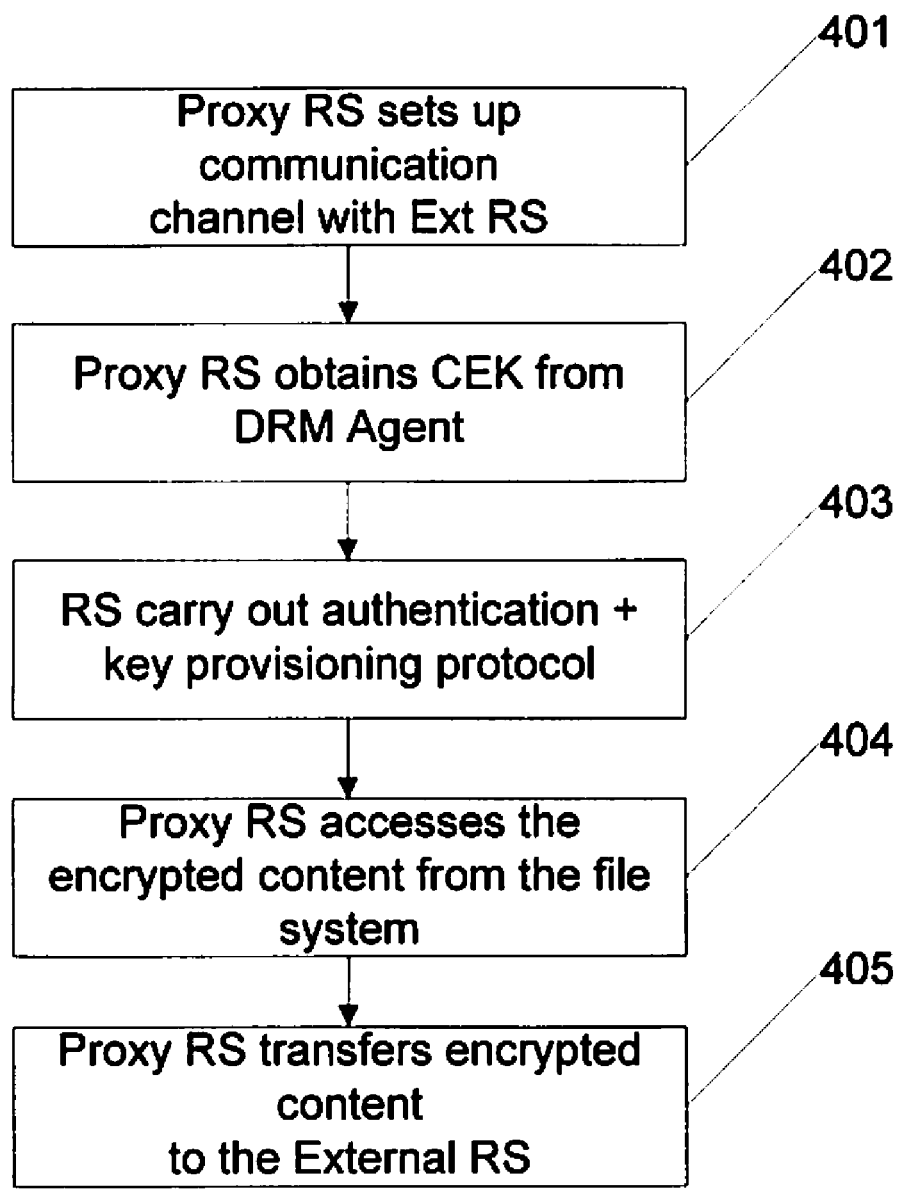
FIG. 4 illustrates a flow chart of an embodiment in a non-preprocessing mode.

FIG. 4 illustrates a flowchart of an embodiment in the non-preprocessing mode: After completing a successful open request indicating that a valid license was available for the protected content, the Proxy RS (103) in step 401 then sets up a communication channel with the Ext RS (102). In step 402, the Proxy RS (103) before running the key provisioning protocol obtains the Content Encryption Key (CEK) from the DRM agent (105), in which e.g. the Proxy RS (103) receives a pointer to the CEK in Random Access Memory (RAM) via a function call. If a protocol providing a higher security level is required for this depends on what trust level that exists between the DRM agent (105) and the Proxy RS (103), wherein the trust level may be determined by means of authentication of the mobile devices software used for the Proxy RS (103) itself and any software used as part of the process involved to communicate with the DRM agent (105) or by other known relations between these entities, such as the device manufacturers control of the entities in the mobile device (100). In many cases the Proxy RS (103) can in this situation be regarded as being a part of the DRM agent, and hence the initially described simple protocol can be used i.e. thus to only send a pointer. In step 403, the Proxy RS (103) and the Ext RS (102) carry out an authentication protocol, together with a key provisioning protocol to securely transfer the CEK, i.e. the same content encryption key that is used by the DRM agent (105) in decrypting the DRM protected content. In step 404, the Proxy RS (103) accesses the encrypted content directly from the internal file system (107) and in step 405 transfers the encrypted content to the Ext RS (102). The flow control for these operations can have either the Ext RS (102) as responsible via data pull, or the Proxy RS (103) as responsible via data push. Depending on which is the case, the request methods involved in the interface between the Ext RS (102) and the Proxy RS (103) may have different designs, which is well understood by the skilled person in the art.

Authentication and Key Negotiation:

The authentication and key negotiation between the Proxy RS (103) and the Ext RS (102) is similar for both the preprocessing and non-preprocessing modes. In both modes, the Proxy RS (103) authenticates the Ext RS (102). In one embodiment, the Ext RS (102) is provisioned with a private-public key pair that is used both for authentication and key provisioning. For example, the key pair can be stored in the Ext RS (102) itself or in a smart card attached to the Ext RS (102). The public key is certified by a certificate authority (CA) trusted by the DRM device (100). For example, a Rights Issuer (RI) or a Content Issuer (CI) might act as the CA, and the CA is typically the same as who issued certificates for the DRM device (100), RI, and CI if such certificates are part of the DRM solution, e.g. according to OMA DRM v2. The certificate is stored together with the private key in the Ext RS (102) or in the smart card attached to Ext RS (102).

Figure 5A:
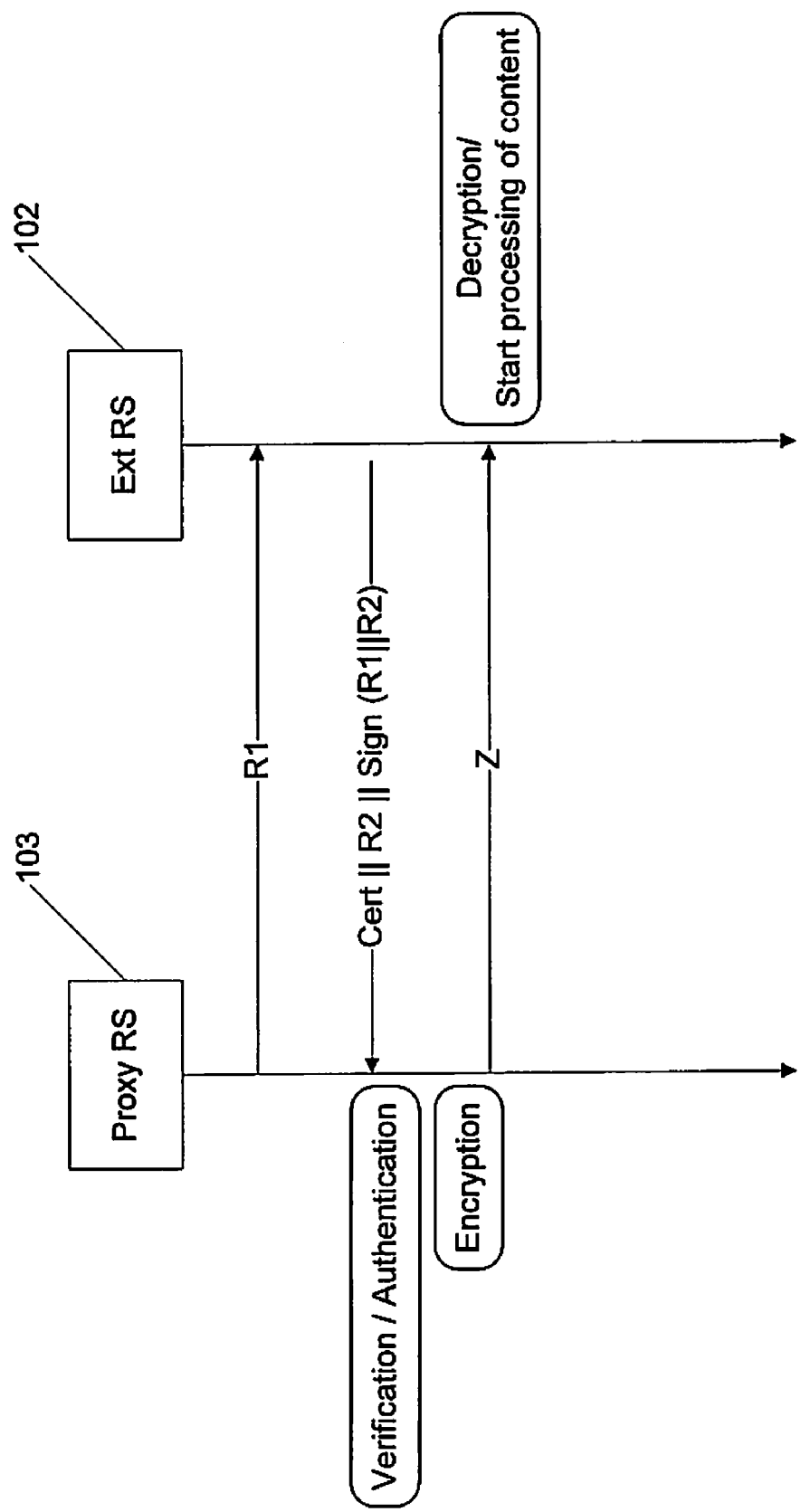
FIG. 5a illustrates a sequence chart of an embodiment in an authentication and key provisioning procedure.

FIG. 5a illustrates an embodiment of an authentication and key provisioning procedure.

The authentication and key provisioning is performed as follows:

1. The Proxy RS (103) initiates the authentication by sending a random number R1 to the Ext RS (102).
2. The Ext RS (102) responds by sending its certificate, a random number R2 generated by the Ext RS (102), and a signature of R1 concatenated with R2 signed with the Ext RS (102) private key.
3. The Proxy RS (103) authenticates the Ext RS (102) by verifying the Ext RS (102) certificate against the trusted CA certificate stored in the DRM device (100). This is the certificate of the CA that issued the Ext RS (102) certificate. The Proxy RS (103) also verifies the signature of R1 concatenated with R2. If the signature is correct the Proxy RS (103) knows that the Ext RS (102) has access to the private key corresponding to the public key of the Ext RS (102) certificate.

Depending on the mode, if it is non-preprocessing or preprocessing mode, the encryption key used to protect the content when transferred from the Proxy RS (103) to the Ext RS (102) is either the original content encryption key (CEK) or chosen at random by the Proxy RS (103).

4. If preprocessing mode then the Proxy RS (103) chooses a random temporary session encryption key, K, and if non-preprocessing mode then K=CEK, where CEK is obtained from the DRM agent (105). The Proxy RS (103) then encrypts K concatenated with R2 and sends the encrypted value, Z, to the Ext RS (102). The encryption is done using the Ext RS (102) public key obtained from the Ext RS (102) certificate.
5. The Ext RS (102) decrypts Z using the Ext RS (102) private key to obtain the R2 and the encryption key used to protect the content. The Ext RS (102) checks if the decrypted R2 matches the R2 that was sent in step 2. If successful, the Ext RS (102) accepts K and starts to process the encrypted content.

The use of random numbers provides a protection against replay attacks. The random number R1 is used as a challenge to ensure that the device really has the private key corresponding to the certificate. The random number R2 provides protection against e.g. a hacker that has recorded all traffic between the Proxy RS (103) and Ext RS (102) cannot just send the messages all over again to the Ext RS (102). Since the Ext RS (102) chooses R2 at random every time, such an attack will be discovered in step 5 where the decrypted random value will not be equal to the new R2.

The protocol above can be extended to include authentication of the Proxy RS (103) by the Ext RS (102).

Figure 5B:
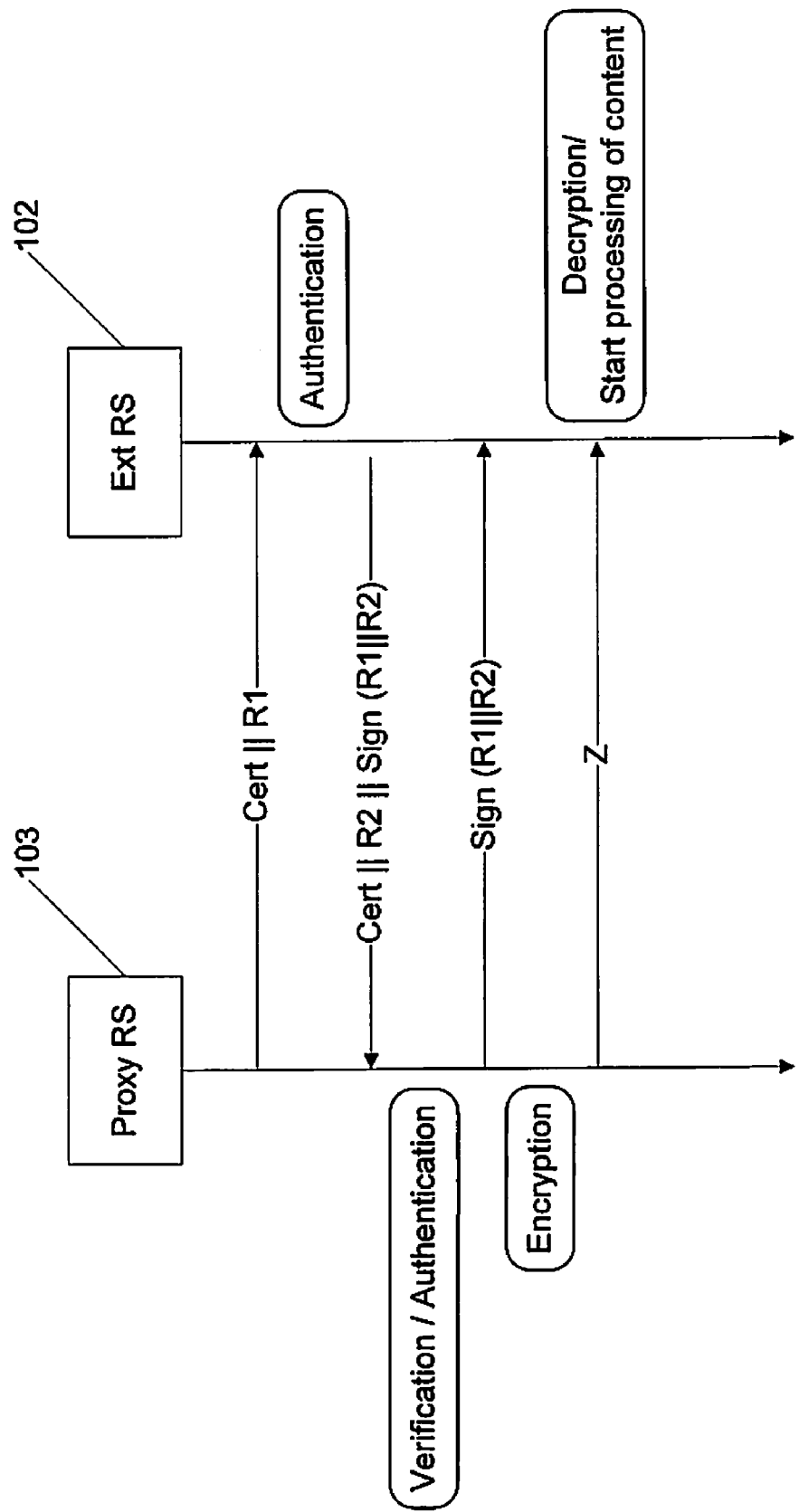
FIG. 5b illustrates a sequence chart of another embodiment in an authentication and key provisioning procedure.

FIG. 5*b* illustrates another embodiment of an authentication and key provisioning procedure.

The authentication and key provisioning is performed as follows:

1. The Proxy RS (103) initiates the authentication by sending a random number R1 and the DRM device certificate to the Ext RS (102).
2. The Ext RS (102) verifies the certificate against the trusted CA certificate stored in the Ext RS (102). This is the certificate of the CA that issued the DRM device certificate. If the certificate is valid, the Ext RS (102) responds by sending its certificate, a random number R2 generated by the Ext RS (102), and a signature of R1 concatenated with R2 signed with the Ext RS (102) private key.
3. The Proxy RS (103) authenticates the Ext RS (102) by verifying the Ext RS (102) certificate against the trusted CA certificate stored in the DRM device. This is the certificate of the CA that issued the Ext RS (102) certificate. The Proxy RS (103) also verifies the signature of R1 concatenated with R2. If the signature is correct, the Proxy RS (103) knows that the Ext RS (102) has access to the private key corresponding to the public key of the Ext RS (102) certificate.
4. If correct, the Proxy RS (103) responds by sending a signature of R1 concatenated with R2 signed with the DRM device private key.

Depending on the mode, if it is non-preprocessing or preprocessing mode, the encryption key used to protect the content when transferred from the Proxy RS (103) to the Ext RS (102) is either the original content encryption key (CEK) or chosen at random by the Proxy RS (103).

5. If preprocessing mode then the Proxy RS chooses a random temporary session encryption key, K, and if non-preprocessing mode then K=CEK, where CEK is obtained from the DRM agent (105). The Proxy RS (103) then encrypts K and sends the encrypted value, Z, to the Ext RS. The encryption is done using the Ext RS public key obtained from the Ext RS certificate.
6. The Ext RS decrypts Z using the Ext RS private key to obtain the encryption key used to protect the content. If OK, the Ext RS accepts K and starts to process the encrypted content.

An example of an algorithm to be used for such authentication and key provisioning in the protocol above is the RSA algorithm with SHA-1 hashing. This algorithm is already used in OMA DRM v2.

Further, another example of authentication and key provisioning could be realized with a shared secret, i.e. a symmetrical key, between the Proxy RS (103) and the Ext RS (102).

FIG. 5*c* illustrates an embodiment of an authentication and key provisioning procedure by means of a shared secret.

The authentication and key provisioning is performed as follows:

1. The Proxy RS (103) initiates the authentication by sending a random number R1 to the Ext RS (102).
2. The Ext RS (102) chooses a random number R2 and encrypts, with the shared secret, R1 concatenated with R2 and sends the result T=E_K(R1∥R2) to the Proxy RS (103), where K is the shared secret.
3. Proxy RS (103) decrypts T with K and verifies that the first part of the result matches R1.
4. If the result matches, then the Proxy RS (103) encrypts T2=E_K(R2∥K2) and sends it to the Ext RS (102), where K2 is a random session key in the preprocessing mode and K=CEK in the non-preprocessing mode.
5. The Ext RS (102) decrypts T2 and verifies that the first part of the result matches R2.

With the above method, both parties are authenticated and share the key K2 with which one can decrypt DRM content which has been transferred.

Which example of algorithm that is used depends greatly on the computational capacity of the Ext RS (102), e.g. asymmetrical encryption is more computationally demanding than symmetrical encryption.

Encrypting/Decrypting the DRM Content:

After the authentication and key provisioning performed as described above, the Proxy RS (103) sends the content in encrypted form to the Ext RS (102). In preprocessing mode, the Proxy RS (103) obtains decrypted DRM data via the DRM agent (105) as a device RS (106). The Proxy RS (103) then processes the content and encrypts the processed content using the negotiated encryption key K. In non-preprocessing mode, the Proxy RS (103) reads originally encrypted DRM data directly from the internal file system (107) and sends it to the Ext RS (102). The Ext RS (102) decrypts the data using the negotiated key K. For example, the AES algorithm, which is also used in OMA DRM v2 can be used as the encryption algorithm.

In order to provide full transparency for the Ext RS (102) regarding which DRM solution that is used in the mobile device (100), certain information, i.e. rendering parameters, may need to be provided to the Ext RS (102). Information such as encryption cipher used, encryption key, initialization vector (IV), padding scheme, offset to byte in content file where decryption should start, and the size of the encrypted content etc.

The needed information is provided by means of a protocol where the encryption cipher is negotiated, i.e. if the Ext RS (102) does not support the initially used encryption cipher, the content is decrypted and re-encrypted by the DRM agent (105) to the encryption cipher that was negotiated to in the pre-processing mode.

Further, the IV is often transmitted as part of the content file, normally placed immediately in front of the start of the encrypted content. The IV could also be clarified and/or defined in the protocol.

A DRM protected file normally includes some content metadata, and other DRM specific parameters, e.g. the content ID, which is used to link it to license(s). This data is often placed in front of the encrypted content and with an offset parameter provided, hence the Ext RS (102) does not need to have knowledge of the location and size of this other data. The size of the encrypted content could also be provided as it is not always the case that the encrypted data extends to the end of the file, i.e. there may be other data after the end of the encrypted media data.

In the pre-processing mode, the DRM specific parts are automatically separated out as the Proxy RS (103) is only receiving the decrypted content data from the device DRM agent (105). However, in the non-preprocessing mode this data is included in the file transmitted to the Ext RS (102). Further, for the non-preprocessing mode there is also a possibility for the Proxy RS (103) to remove any non-essential data in the file to be transmitted.

In the protocol, the Ext RS (102) states which cipher suites (CS), including e.g. signature algorithm and crypto algorithm, which the Ext RS (102) supports. The Proxy RS (103) then chooses from the list provided by the Ext RS (102) the CS to be used. The protocol comprises the following preceding steps to the authentication and key provisioning steps.

Figure 6:
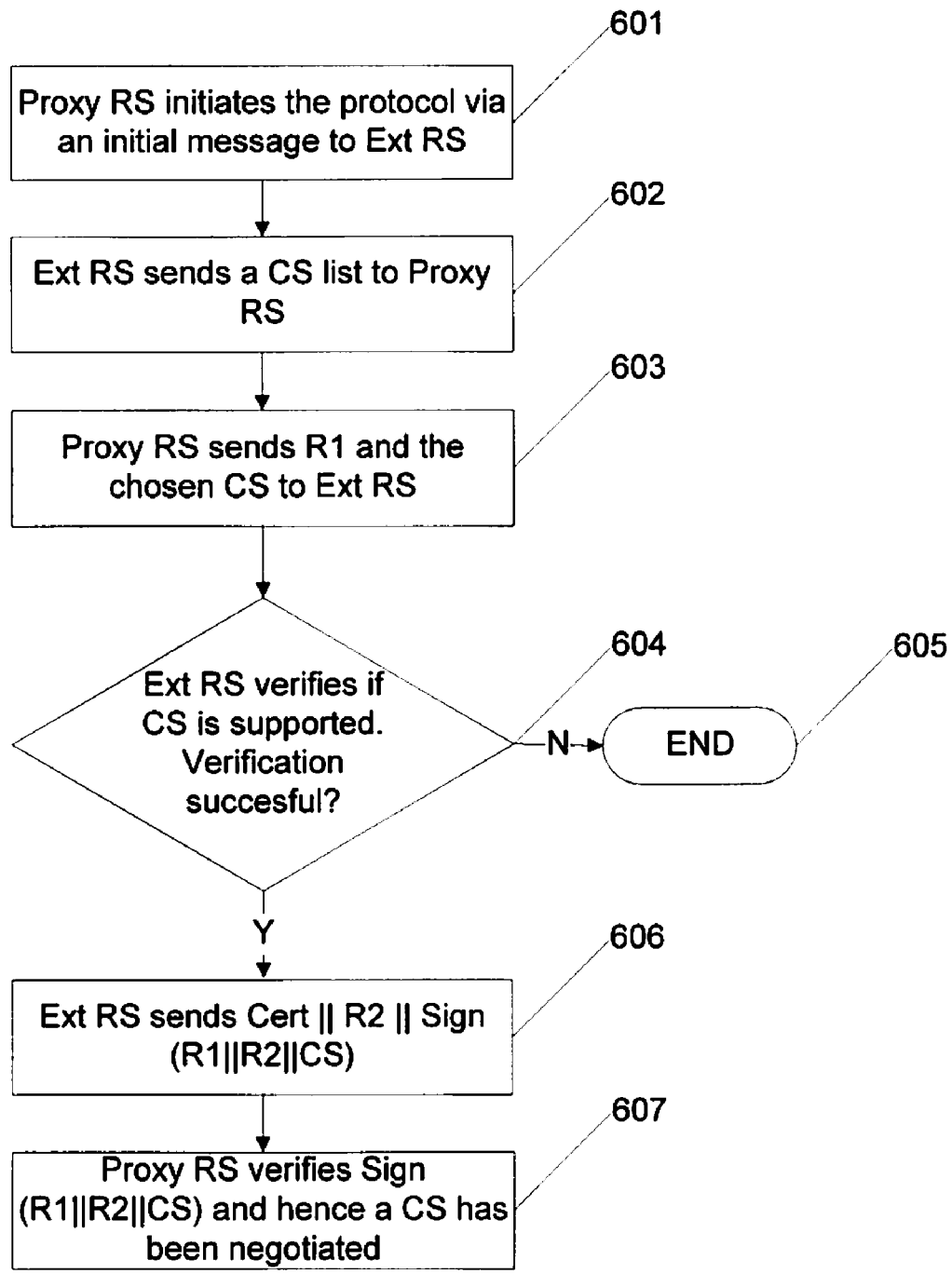
FIG. 6 illustrates a flow chart of an embodiment in a encryption cipher negotiation procedure.

FIG. 6 illustrates a flowchart of an embodiment in a CS negotiation procedure:

Step 601: Optionally, the Proxy RS (103) sends an initial message to the Ext RS (102) in order to initiate the protocol. This step could be omitted and the flow could instead start at step 602.

Step 602: The Ext RS (102) sends a CS list to the Proxy RS (103) with the CS which it supports.

Step 603: In addition to random number R1, the Proxy RS (103) sends the chosen CS, which is supported by the DRM agent (105), to the Ext RS (102).

Step 604: The Ext RS (102) verifies that the chosen CS is included in the CS list which was sent in step 602.

Step 605: If the verification in step 604 is not successful the procedure is ended here.

Step 606: If the verification in step 604 is successful, the Ext RS (102) responds with its certificate, random number R2, and a signature. The signature is over the concatenation of R1, R2 and chosen CS.

Step 607: The Proxy RS (103) then verifies the signature and hence both parties have negotiated a CS and no man-in-the-middle can manipulate the parties to e.g. use different algorithms.

The subsequent steps in the authentication and key provisioning procedures are the same as for the other embodiments.

The Ext RS (102) needs to be trusted that it will not leak the private key, encryption key K, or DRM content. Therefore, only Ext RS (102) from a trusted manufacturer will be issued certificates.

Above described solution fits well into the architecture of for example OMA DRM v2 where all building blocks are already there. It can be built upon standard cryptography techniques using for example the well-known RSA algorithm.

Further, the invention provides for different media types/formats and use cases, a seamless extension of the DRM realm to devices external (104) to the DRM agent device (100) without requiring that a complete DRM agent is implemented in these external devices (104). For example, all knowledge and handling of DRM licenses is kept within the DRM agent (105).

It will be appreciated by those of ordinary skill in the art that the invention can be embodied in various specific forms without departing from its essential characteristics. The disclosed embodiments are considered in all respects to be illustrative and not restrictive. The scope of the invention is indicated by the appended claims, rather than the foregoing description, and all changes that come within the meaning and range of equivalents thereof are intended to be embraced thereby.

It should be emphasized that the terms "comprises" and "comprising", when used in this description and claims, are taken to specify the presence of stated features, steps, or components, but the use of these terms does not preclude the presence or addition of one or more other features, steps, components, or groups thereof.

What is claimed is:

1. A method for rendering content, comprising the steps of:
setting up a communication channel between a proxy rendering server of a mobile device and an external rendering server of an external device;
authenticating at least the external rendering server and upon successful authentication transferring a key from the proxy rendering server to the external rendering server;
transferring the content encrypted with the transferred key from the proxy rendering server to the external rendering server for rendering the content;
where the rendering of the content is performed in one of two modes, either in a preprocessing mode for performing processing of the content by the mobile device prior to transferring the content to the external rendering server, or in a non-preprocessing mode for performing processing of the content by the external device subsequent to receiving the content, and that a digital rights management (DRM) agent for digitally managing permissions associated with the content is only present in the mobile device and not in the external rendering server to relieve the external rendering server of a need to enforce DRM rights associated with the content, where the external rendering server is not part of same physical device or software control system as the mobile device;
where the preprocessing mode implemented by the mobile device further comprises the steps of:
authenticating at least the external rendering server via an authentication protocol, and upon successful authentication;
transferring the temporary key from the proxy rendering server to the external rendering server via a key provisioning protocol;
accessing decrypted content from the DRM agent;
preprocessing the decrypted content;
re-encrypting the decrypted and preprocessed content; and
transferring the re-encrypted content to the external rendering server for decryption and rendering of the content; and
where the non-preprocessing mode implemented by the mobile device further comprises the steps of:
obtaining the Content Encryption Key from the DRM agent of the mobile device;
authenticating at least the external rendering server via an authentication protocol;
and upon successful authentication;
transferring the Content Encryption Key from the proxy rendering server to the external rendering server via a key provisioning protocol;
accessing encrypted content from a file system in the mobile device; and
transferring the encrypted content to the external rendering server for decryption and rendering of the content.

2. The method according to claim 1, where the key is a temporary key in the preprocessing mode.

3. The method according to claim 1, where the preprocessing of the decrypted content comprises modification of a format of the content.

4. The method according to claim 1, where the preprocessing of the decrypted content comprises filtering of the content.

5. The method according to claim 1, where the preprocessing of the decrypted content comprises extending the content by adding rendering parameters.

6. The method according to claim 1, where the preprocessing of the decrypted content comprises synchronizing the content according to a presentation time.

7. The method according to claim 1, where the key is a Content Encryption Key in the non-preprocessing mode.

8. The method according to claim 1, where the external device has rendering capabilities.

9. The method according to claim 1, where the authenticating further includes authenticating the proxy rendering server.

10. The method according to claim 1, where the communication between the mobile device and the external device is protected via an authentication protocol, and wherein the exchange of keys is enabled via a key provisioning protocol.

11. The method according to claim 10, where the authentication protocol and key provisioning protocol is preceded by a cipher suite negotiation protocol comprising the steps of:
the external rendering server sending a cipher suite list to the proxy rendering server;
the proxy rendering server responding by sending a random number and the chosen cipher suite to the external rendering server;
the external rendering server verifying the chosen cipher suite, and upon successful verification, accepting a commonly negotiated cipher suite.

12. The method according to claim 10, where the authentication protocol and key provisioning protocol is preceded by a step of sending rendering parameters.

13. The method according to claim 12, where the rendering parameters are selected from a group consisting of: encryption cipher, encryption key, initialization vector (IV), padding scheme, offset to byte in content file where decryption should start, and the size of the encrypted content.

14. The method according to claim 1, where the method further comprises the steps of, prior to setting up a communication channel between the proxy rendering server and the external rendering server:
evaluating if the rendering resources are present in the mobile device, and if the rendering resources are present in the mobile device,
determining if the rendering is to be performed by the mobile device, and if the mobile device is to render the content, performing the following steps:
directing a request for rendering content from application software of the mobile device to a device rendering server of the mobile device;
verifying license credentials by the DRM agent;
allowing rendering of content upon successful verification; and
further directing the rendering request to the proxy rendering server.

15. The method according to claim 1, where the method further comprises the steps of, prior to setting up a communication channel between the proxy rendering server and the external rendering server:
evaluating if the rendering resources are present in the external device, and if the rendering resources are present in the external device,
determining if the rendering is to be performed by the external device, and if the external device is to render the content, performing the following steps:
directing a request for rendering content from application software of the mobile device to a proxy server of the mobile device;
verifying license credentials by the DRM agent; and
allowing rendering of content upon successful verification.

16. The method according to claim 15, where the evaluating and determining steps are performed by application software.

17. The method according to claim 1, where selection of the modes is performed by means of a capability discovery procedure indicating which mode to use for the external device.

18. The method according to claim 1, where selection of the modes is performed by means of a policy stored in the mobile device.

19. The method according to claim 1, where selection of the modes is performed by an active decision by an end-user.

20. An electronic device for facilitating rendering of content in an external device, the electronic device comprising:
a processor;
application software adapted to be executed by the processor for generating a request for rendering content;
a rendering server for receiving the request for rendering content;
a digital rights management (DRM) agent for verifying license credentials;
a proxy rendering server for setting up a communication channel with the external device and transferring content, where the electronic device is adapted to facilitate the content rendering in one of two modes, either in a preprocessing mode for performing processing of content by the electronic device prior to transferring the content to the external rendering server, or in a non-preprocessing mode for performing processing of content by the external device subsequent to receiving the content, and that the DRM agent for digitally managing credentials associated with the content is only present in the electronic device and not in the external device to relieve the external device of a need to enforce DRM rights associated with the content, where the external device is not part of same physical device or software control system as the mobile device;
the electronic device is adapted to facilitate the preprocessing mode by:
authenticating at least the external rendering server via an authentication protocol, and upon successful authentication;
transferring the temporary key from the proxy rendering server to the external rendering server via a key provisioning protocol;
accessing decrypted content from the DRM agent;
preprocessing the decrypted content;
re-encrypting the decrypted and preprocessed content; and
transferring the re-encrypted content to the external device for decryption and rendering of the content; and
the electronic device is adapted to facilitate the non-preprocessing mode by:
obtaining the Content Encryption Key from the DRM agent of the mobile device;
authenticating at least the external rendering server via an authentication protocol;
and upon successful authentication;
transferring the Content Encryption Key from the proxy rendering server to the external device via a key provisioning protocol;
accessing encrypted content from a file system in the mobile device; and
transferring the encrypted content to the external device for decryption and rendering of the content.

21. The electronic device according to claim 20, where the electronic device is a mobile device.

22. The electronic device according to claim 21, where the external device is a trusted entity.

23. The electronic device according to claim 21, where communication between the mobile device and the external device is protected via an authentication protocol, and where the exchange of keys is enabled via a key provisioning protocol.

* * * * *

UNITED STATES PATENT AND TRADEMARK OFFICE
CERTIFICATE OF CORRECTION

PATENT NO. : 8,166,300 B2
APPLICATION NO. : 12/300435
DATED : April 24, 2012
INVENTOR(S) : Bjorkengren et al.

It is certified that error appears in the above-identified patent and that said Letters Patent is hereby corrected as shown below:

In Column 7, Line 22, delete "mode:" and insert -- mode. --, therefor.

Signed and Sealed this
Fourth Day of September, 2012

David J. Kappos
*Director of the United States Patent and Trademark Office*